United States Patent [19]
Gehlot

[11] Patent Number: 6,060,989
[45] Date of Patent: May 9, 2000

[54] SYSTEM AND METHOD FOR PREVENTING AUTOMOBILE ACCIDENTS

[75] Inventor: Narayan L. Gehlot, Sayerville, N.J.

[73] Assignee: Lucent Technologies Inc., Murray Hill, N.J.

[21] Appl. No.: 09/175,397

[22] Filed: Oct. 19, 1998

[51] Int. Cl.[7] .................................................. G08B 23/00
[52] U.S. Cl. ........................ 340/576; 340/436; 340/903; 340/439; 180/272
[58] Field of Search ..................... 340/576, 575, 340/309.15, 439, 457, 436, 901, 903, 904; 180/272, 167, 168, 169, 170; 342/70, 71, 72; 367/905, 112, 96, 97, 107

[56] References Cited

U.S. PATENT DOCUMENTS

| | | | |
|---|---|---|---|
| 4,829,434 | 5/1989 | Karmel et al. | 364/424.1 |
| 5,357,438 | 10/1994 | Davidian | 340/436 |
| 5,432,509 | 7/1995 | Kajiwara | 340/903 |
| 5,465,079 | 11/1995 | Bouchard et al. | 340/576 |
| 5,546,311 | 8/1996 | Sekine . | |
| 5,570,087 | 10/1996 | Lemelson | 340/576 |
| 5,574,641 | 11/1996 | Kawakami et al. | 340/576 |
| 5,694,116 | 12/1997 | Kojima | 340/576 |
| 5,709,281 | 1/1998 | Sherwin et al. | 180/272 |
| 5,717,606 | 2/1998 | Hara et al. | 340/576 |
| 5,745,031 | 4/1998 | Yamamoto | 340/576 |
| 5,815,070 | 9/1998 | Yoshikawa | 340/576 |
| 5,821,860 | 10/1998 | Yokoyama et al. | 340/576 |
| 5,847,661 | 12/1998 | Ricci . | |
| 5,874,892 | 2/1999 | Antonellis et al. | 340/576 |
| 5,878,156 | 3/1999 | Okumura | 340/576 |

*Primary Examiner*—Nina Tong

[57] ABSTRACT

A system for preventing or reducing vehicle accidents comprising one or more sensors positioned on a vehicle sensing a condition or conditions indicative of a drivers ability to effectively control the vehicle; a processing unit in communication with the sensors, the processing unit receiving data from the sensors, analyzing the data to determine an appropriate response and initiating the response.

16 Claims, 4 Drawing Sheets

SYSTEM AND METHOD FOR PREVENTING AUTOMOBILE ACCIDENTS

FIELD OF THE INVENTION

This invention relates to a system and method for preventing or reducing vehicle accidents, and, in particular, to a system and method for preventing or reducing accidents caused by a driver driving while intoxicated or exhibiting other driver impairments.

BACKGROUND OF THE INVENTION

The present invention is directed at saving lives by preventing or reducing fatal vehicle accidents. The present invention relates to a system and method for preventing or reducing accidents caused by driving while intoxicated (DWI) and other driver impairments, such as drowsiness that may be due to lack of sleep, long driving hours, fatigue, or side effects of medication, etc. The present invention could also reduce vehicle insurance rates for all drivers by reducing and/or eliminating vehicle accidents caused by the aforementioned.

There exists in the prior art a number of individual devices to aid in preventing accident and/or limiting fatalities or injuries due to vehicle accidents. For example, anti-lock brake systems have proven effective in reducing accidents due to slippery road conditions by preventing the wheels from locking up. Air bags in vehicles are effective in reducing the fatal injuries caused by vehicle accidents. Windshield wipers and defogging systems have been effective devices for reducing accidents by improving driver visibility. However, none of these systems, alone or in combination, are effective for preventing accidents from occurring when a driver who is under the influence or alcohol, or too tired to be an effective driver, gets behind the wheel of a vehicle.

One known system or method in place today for preventing or reducing accidents caused by DWI is for the police to find and stop a drunk driver and arrest him or her. However, the probability of the police finding and catching each driver under the influence is very small. This fatal combination of many drivers under the influence on the road, and the relative small number who are caught, leads to high accident rates and fatalities. As per recent data, there are more deaths due to vehicle accidents every year in the United Sates and other industrialized nations than by any illness or war.

The prior art systems and reliance on police presence are inadequate to meet the demands of eliminating or reducing drunk drivers and those who are too tired to be driving effectively. For example, the probability of the police pulling over a drunk driver is small. Furthermore, there is no real-time system which can provide feedback, or take decisive action, in response to a driver who is drunk, drowsy or has poor response time to certain conditions. The cost to taxpayers by using police in such an inefficient manner is high, and there is a real possibility for bias on the part of police in stopping motorists. Furthermore, designated drivers are often hard to find and at times even they have been consuming alcohol as well. The present invention is directed at overcoming the shortcomings of the prior art and is directed at preventing or reducing the number of fatal vehicle accidents caused by DWI or other driver impairments.

SUMMARY OF THE INVENTION

The present invention relates to a system and method for preventing or reducing vehicle accidents, and, in particular, to a system and method for preventing or reducing accidents caused by a driver driving while intoxicated or exhibiting other driver impairments.

In a preferred embodiment, the system generally includes a plurality of sensors located at predetermined locations on a vehicle. The sensors are continuously monitored by one or more processing units. The processing unit receives safety data from the sensors, either individually or in combination. The processing unit analyzes the safety data to determine if an alarming, unusual or above-threshold condition exists. Upon receipt of such safety data, processing may be increased and safety data from one or more other sensors may be gathered in parallel and analyzed to avoid false alarms. Safety data from one or more different sensors is gathered and weighted depending on, for example, the weather, speed of the car and road conditions, or any combination thereof. If an alarming, unusual or above-threshold condition is detected, the system provides for a plurality of responses ranging from, for example, the giving of audio or visual warnings, to taking actual control of certain functions of the vehicle and automatically calling the police. It is envisioned that the system and method of the present system would be desirable to many different entities or individuals, such as, for example, shippers, couriers, police agencies, insurance companies and parents, to name a few. For example, an insurance company faced with insuring a driver who has previously been found driving under the influence of alcohol, may require a system designed in accordance with the instant invention be installed in that drivers vehicle. Also, an insurance company and/or state and federal agencies may offer incentives such as discounts to those who voluntarily install the system of the present invention.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

In the drawing figures, which are not to scale, and which are merely illustrative, and wherein like reference numerals depict like elements throughout the several views.

DETAILED DESCRIPTION OF THE PREFERRED EMBODIMENTS

The present invention relates to a system and method for preventing or reducing vehicle accidents, and, in particular, to a system and method for preventing or reducing accidents caused by a driver driving while intoxicated or exhibiting other driver impairments.

Figure 1:
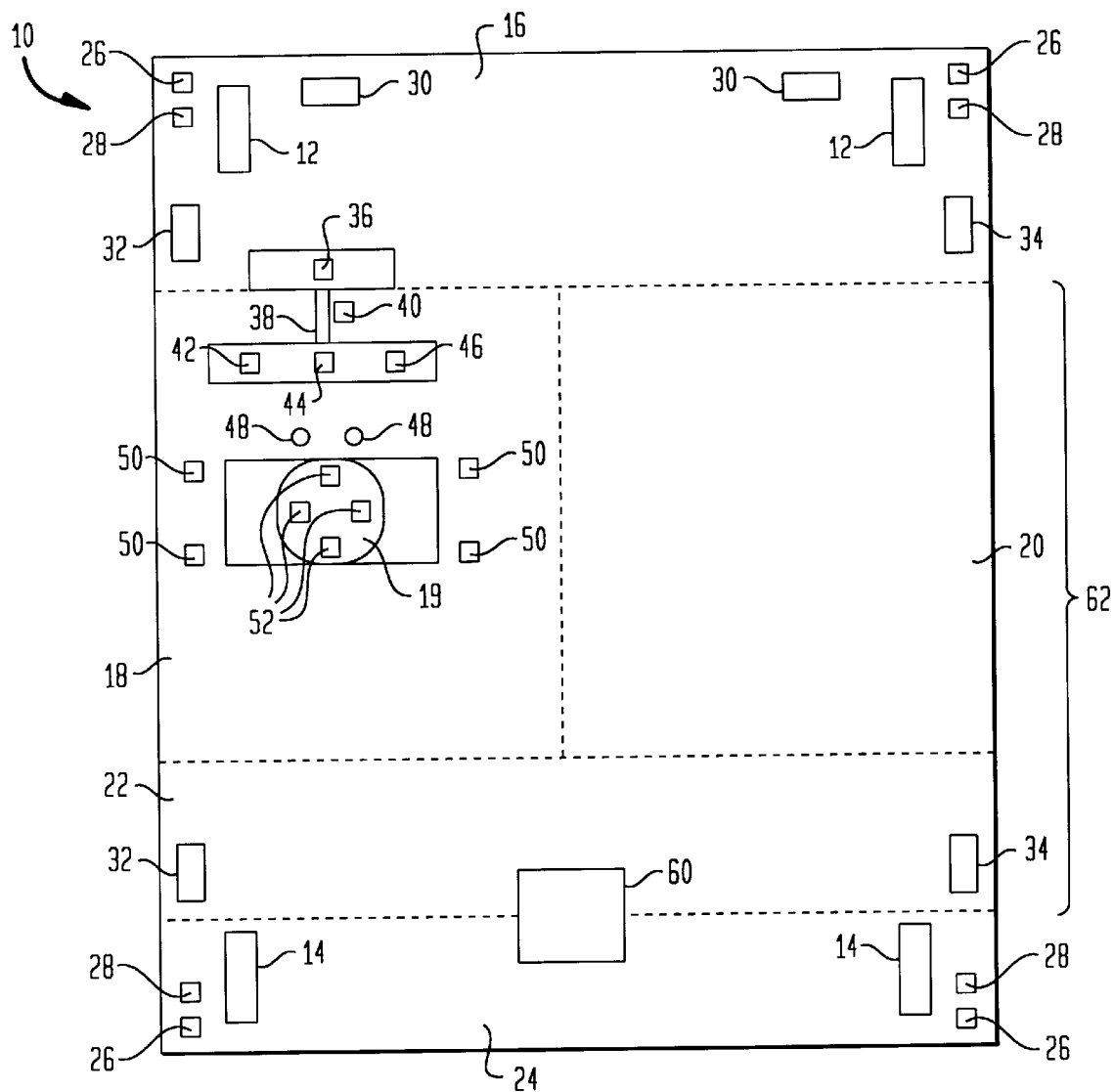
FIG. 1 is a top view of a vehicle with a plurality of sensors located at predetermined positions thereon in accordance with the present invention.

In a preferred embodiment, as seen in FIG. 1, the system generally includes a plurality of sensors located at predetermined locations on a vehicle generally indicated as 10. Vehicle 10 generally includes two front wheels 12, two rear wheels 14, an engine compartment 16, a driver section 18, a passenger section 20, a rear seat section 22 and a trunk section 24. Driver section 18, passenger section 20 and rear seat section 22 comprise a passenger cabin 62. Engine compartment 16, driver section 18, passenger section 20, rear seat section 22 and trunk section 24 are defined for purposes of the present invention as sections within vehicle 10. One of skill in the art will recognize that the system of the present invention will work equally well with any moving vehicle, for example, automobiles, trucks, trains, boats, aircraft, etc. Thus, the term vehicle, as used herein, is intended to cover a broad range of moving objects, and is in no way limiting of the present invention.

The sensors are designed, constructed and positioned so as to detect conditions both within vehicle 10 and conditions outside vehicle 10. That is, the sensors are designed, constructed and positioned so as to detect one or more conditions within any one or more of engine compartment 16, driver section 18, passenger section 20, rear seat section 22 and trunk section 24. The sensors are also designed, constructed and positioned so as to detect one or more conditions outside of engine compartment 16, driver section 18, passenger section 20, rear seat section 22 and trunk section 24, i.e., outside vehicle 10.

By way of a non-limiting example, the type of sensors utilized can be selected from any number of commercially available sensors such as motion sensors, infrared sensors, position sensors, audio sensors, video sensors, chemical sensors, sound sensors, touch sensors or radio frequency sensors, or any combination thereof. One of skill in the art will recognize that a specially designed sensor may also be utilized without departing from the spirit of the invention. Table 1 below outlines an example of the type and number of sensors used in a preferred embodiment of the present invention. One of skill in the art will recognize that the number, type, position and function of the specific sensors indicated is in no way limiting to the present invention, and that any number of additions, subtractions, substitutions or modifications could be made without departing from the spirit of the invention.

TABLE 1

| Sensor | Sensor Name | Quantity, Location | Sensor Type | Sensor Function |
|---|---|---|---|---|
| 40 | Steering Column Movement Sensor | 2, steering column, | motion sensor | detects between steady and unsteady steering |
| 52 | Driver Head Movement Sensor | 5, N, E, S, W, and overhead | position sensor | detects unusual head drooping or head movements |
| 48 | Driver Eye Movement Sensor | 2, in front of face to monitor eyes | IR or motion sensor | detects gazing eyes or closed eyes which are unusual. Normal eye movements of a driver are stored in tests |
| 50 | Driver Body Movement Sensor | 4, 2-front, 2-sides | motion sensor | detects unusual body movement |
| 42 and 46 | Speech Recognition Input + Driver Snoring | 2, steering wheel | audio with speech processing | speech is compared to normal speech sample (read and stored from a |

TABLE 1-continued

| Sensor | Sensor Name | Quantity, Location | Sensor Type | Sensor Function |
|---|---|---|---|---|
| | Sensor | | | standard piece of write up) |
| 44 | Alcohol Detection breath sensor | 2, steering wheel or pull down from or near the front visors | dye on the tip of the fiber, or chemical | may be used in extremes by opening the container or dye at the end of the fiber tip. Once used throw away. Each car may have up to 10–20 sensor heads. They are sealed and sensor an differentiate between tempered sensors. |
| 36 | Road Condition Detection | wiper movement sensors | wiper movement or humidity | detects wet and/or slippery road conditions |
| 26 | Road Side Edge Detection | 4, near all wheels | sound, touch cable or video | detects the side edge of the road |
| 28 | Road Paint Strip Detection | 4, near all wheels | IR, video or dye based | detects the paint strip along road side edge |
| 30 | Front Obstacle Sensor | 2, front sides | IR or RF | detects obstacles in front of car |
| 32 | Left Side Obstacle Sensor | 2, front and rear | IR or RF | detects obstacles left of car |
| 34 | Right Side Obstacle Sensor | 2, front and rear | IR or RF | detects obstacles right of car |

The sensors are designed, constructed and positioned so as to sense one or more conditions which are indicative of the ability of driver 19 to safely drive vehicle 10, i.e., safety data. That is, the present invention is directed at determining whether driver 19 is driving vehicle 10 safely. Safety is, of course, dependent on any number of conditions in combination, such as conditions about driver 19, vehicle 10, and conditions outside of vehicle 10. Thus, the present invention is directed at sensing and analyzing safety data. The safety data comprises conditions regarding driver 19, conditions within vehicle 10, and conditions outside of vehicle 10. The safety data is gathered and analyzed, and if necessary, an appropriate response is initiated. Thus, the ability of driver 19 to safely drive vehicle 10 is not determined by conditions solely outside of vehicle 10, but instead, that information is used in conjunction with other data from within vehicle 10 to determine whether driver 19 is safely driving vehicle 10. One of skill in the art will recognize that each individual sensor may sense and gather safety data relating to one or more conditions.

The sensors are designed, constructed and positioned so as to communicate with a processing unit 60. Processing unit 60 may be located anywhere within vehicle 10. The sensors sense and/or gather safety data to be communicated with processing unit 60. Processing unit 60 may be a Digital Signal Processor or any other comparable type unit for receiving and analyzing data, and controlling controllable devices to initiate pre-programmed responses as a result of analyzing data, such as, for example a programmable microprocessor, micro computer, mini-computer PLC controller, or the like. In a preferred embodiment processing unit 60 may utilize parallel processing or neural network/ fuzzy logic. Processing unit 60 is also capable of receiving data and/or instructions from sources other than the sensors such as remote control devices, cellular telephone signals, paging signals, radio or infrared signals, or externally positioned push buttons or keypads (not shown).

Figure 2:
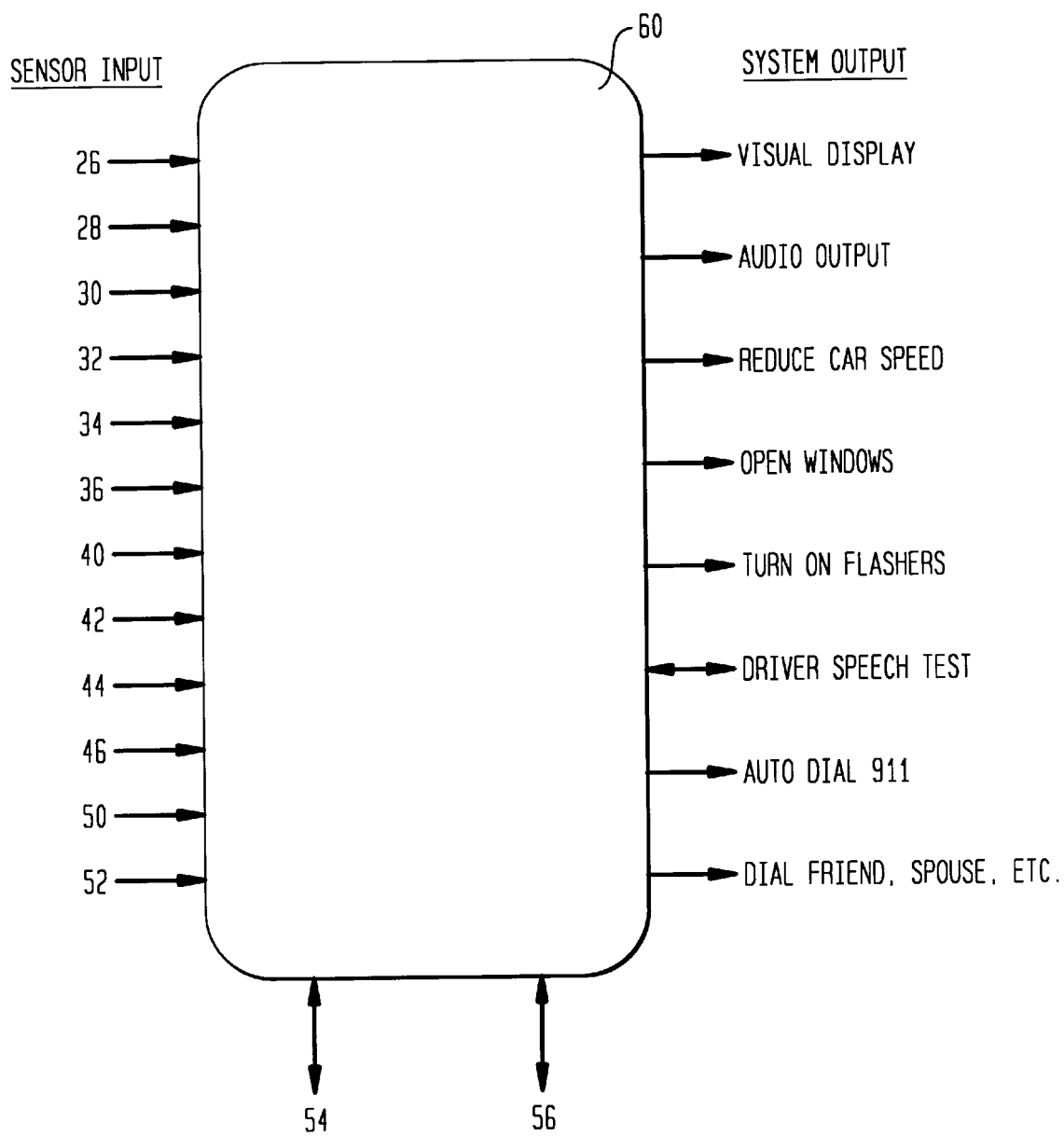
FIG. 2 is a block diagram of the digital signal processor of the present invention.
Figure 3:
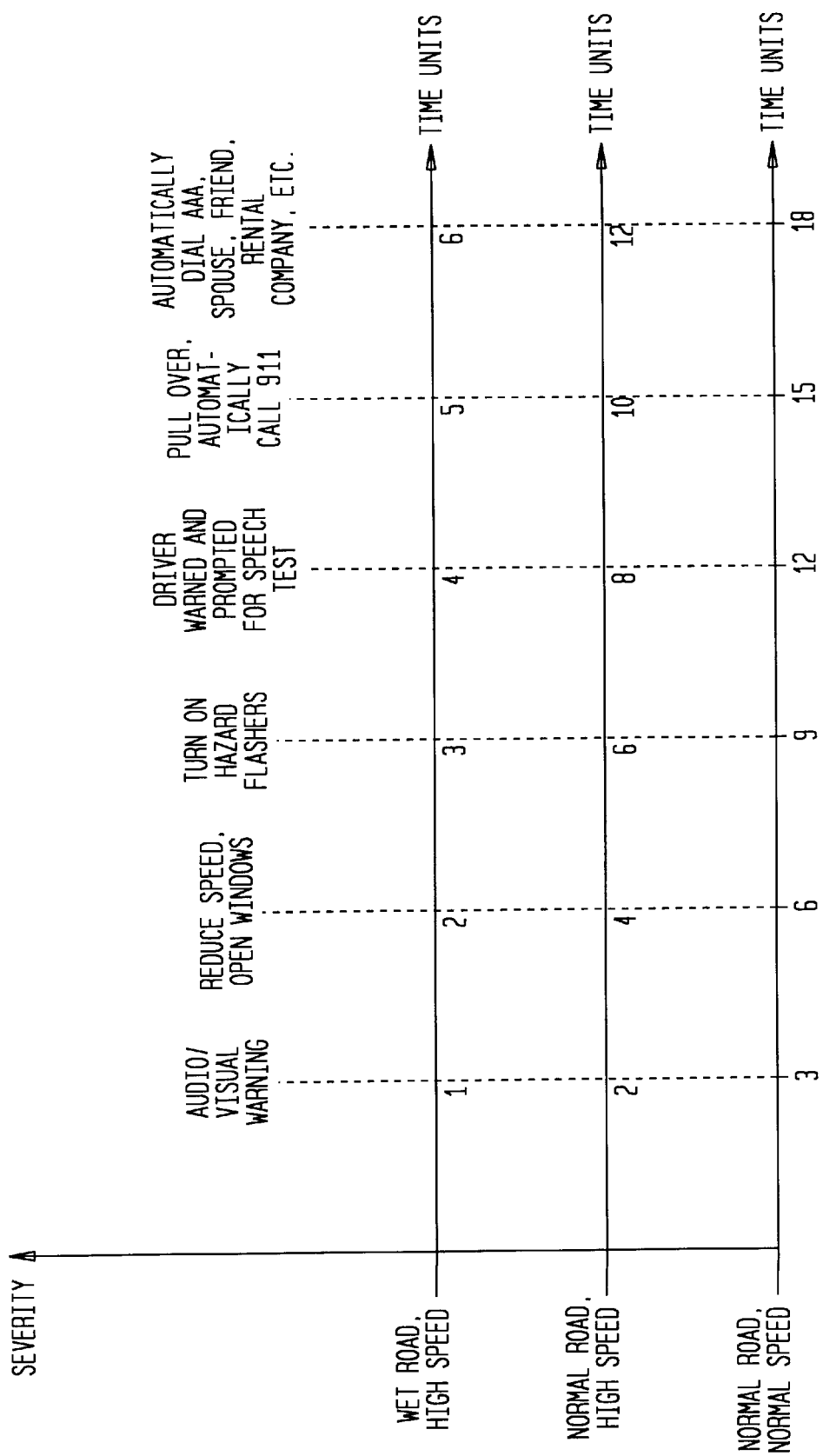
FIG. 3 is a chart depicting an example of the algorithm and/or weighting used for taking different responses provided by the present invention.
Figure 4:
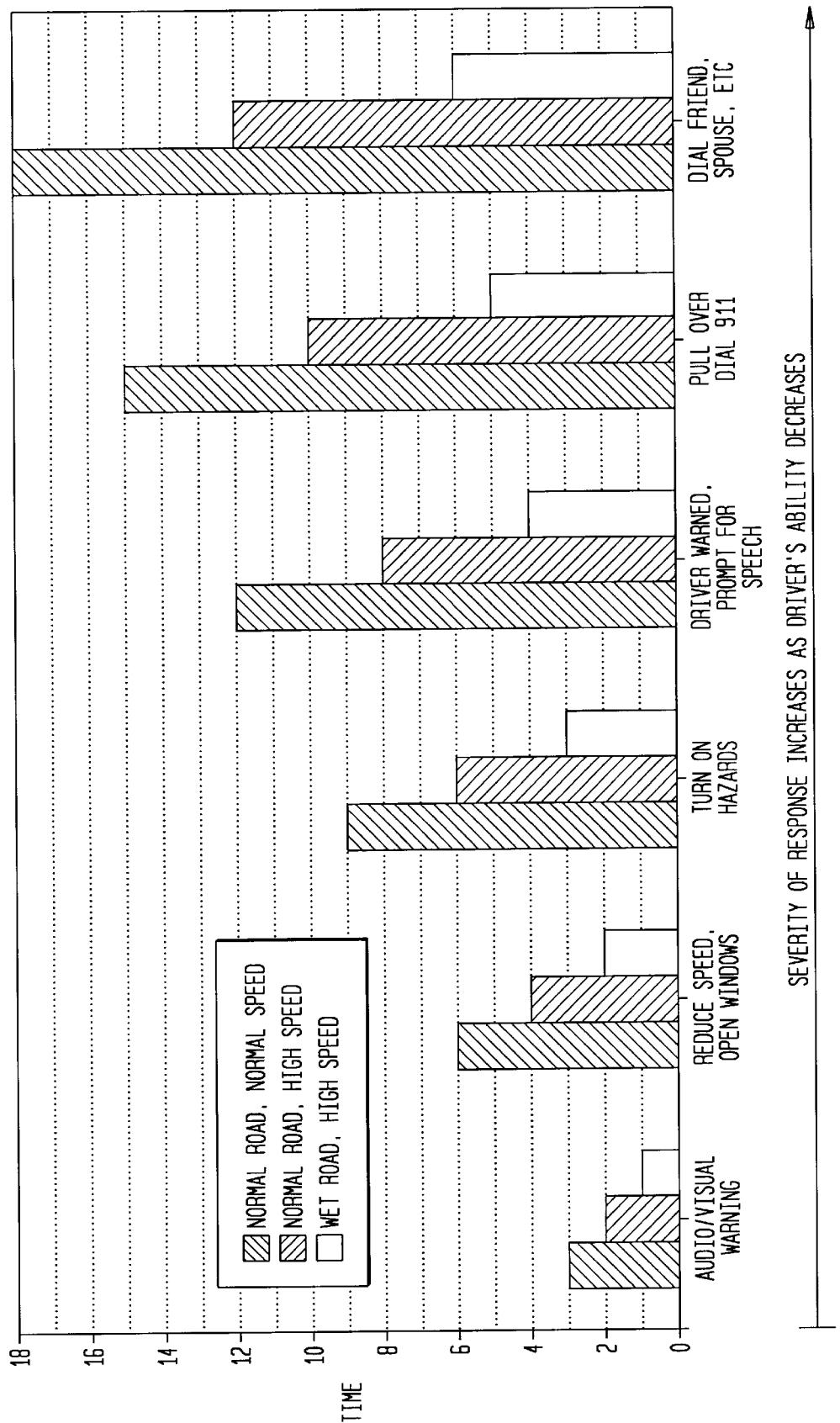
FIG. 4 is a graphical representation of FIG. 3.

As seen in FIG. 2, safety data is gathered from the sensors and communicated to processing unit 60. As described more fully below, processing unit 60 analyzes the safety data and determines whether a response is necessary. Processing unit 60 has a number of predetermined or stored responses or actions. As seen in FIGS. 2–4, such actions may include, by way or a non-limiting example, nothing, an audio or visual signal, reducing the speed of said vehicle, opening one or more windows of said vehicle, turning on a flasher signal, initiating a driver speech slurring test, automatically dialing the police or another party and disabling said vehicle, or any combination thereof. One of skill in the art will recognize that additions, subtractions, substitutions or modifications to the stored predetermined actions may be provided without departing from the spirit of the invention.

As seen in FIG. 2, processing unit 60 may also comprise portals or input ports 54 and 56, which are capable of receiving data and/or instructions from sources other than the onboard sensors via satellite or optical signal conductors. For example, the following type of information may be stored, added, subtracted or modified in processing unit 60: information about vehicle 10, i.e., vehicle identification number, the owner of the vehicle, authorized drivers, rental car information, authorized driver profiles including driving histories, history about the vehicle, etc. Other data and/or instructions may also be stored, added, subtracted or modified in processing unit 60, such as: the police may be capable of overriding false conditions, and/or allowing an alternative driver to drive the vehicle if the first driver is unable or otherwise not allowed. One of skill in the art will recognize that any number of additional portals or input ports could be provided to processing unit 60 without departing from the spirit of the invention. Further, while the term portals and/or input ports have been described above, any type of communication with processing unit 60 is envisioned without the need for an actual physical connection, such as, for example, through electro-magnetic, infrared transmission, or other wireless communication medium.

As seen in the exemplary tables of FIGS. 3 and 4, processing unit 60 may analyze the safety data and determine whether a response is necessary, and if so, which response or combination of responses should be initiated, based numerous parameter permutations. As seen in FIGS. 3 and 4, determining whether a response should be initiated, and what response should be initiated, can depend in part upon on elapsed time, speed of the vehicle and conditions outside of the vehicle 10. Thus, the system of the present invention preferably utilizes a weighting scheme or algorithm to determine the appropriate response. For example, as best seen in FIG. 4, if processing unit 60 determines that the hazard lights should be turned on, such a response will be initiated after nine seconds on normal roads at normal speeds, after six seconds for normal roads and high speed, and after 3 seconds on wet roads and high speeds. As seen in FIGS. 3 and 4, the responses vary in degree such as merely giving audio or visual warnings to actually taking control of the vehicle.

The operation of a preferred embodiment of the present invention will now be described. The sensors are continuously monitored by processing unit 60 and the gathered safety data is analyzed to recognize an alarming, unusual or above-threshold condition. If processing unit 60 determines that an alarming condition exists, processing may be increased and safety data from one or more other sensors may be gathered to avoid false alarms. Safety data from the sensors is gathered and weighted depending on, for example, the weather, speed of the car and road conditions, or any combination thereof. Thus, a wet road condition is analyzed in parallel to elapsed time to determine the severity of the conditions.

If an alarming, unusual or above-threshold condition is detected, the system provides for a plurality of responses. For example, an audio message may be delivered over the car radio, the speed of the vehicle may be automatically reduced, the windows may be opened, etc. In extreme cases, the vehicle may be automatically pulled over to the side of the road and the police may be automatically notified. Other responses may include giving the driver the choice to pull over and take a five minute break. The system may also be configured such that the driver is given a number of chances to pass a certain test wherein if the driver fails, control of the vehicle is taken away from the driver and provided through automated vehicle controls, whereupon the police are notified. One of skill in the art will recognize that the amount and types of responses are limitless, and that the mere addition, subtraction or modification of the responses disclosed herein will not depart from the spirit of the present invention.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A system for monitoring a driver's ability to safely operate a vehicle comprising:

a plurality of sensors positioned on a vehicle;

said sensors capable of gathering safety data indicative of a driver's ability to safely drive said vehicle;

said safety data comprising conditions regarding said driver, conditions within said vehicle, and conditions outside said vehicle;

a processing unit in communication with said sensors, said processing unit receiving said safety data from said sensors, analyzing said safety data to assess said driver's ability, and initiating a predetermined action in response to said assessed ability, said processing unit capable of receiving instructions from a source external to said system to override said predetermined action.

2. The system according to claim 1, wherein each one of said plurality of sensors is selected from a group of sensors consisting of: motion sensors, infrared sensors, position sensor, audio sensors, video sensors, chemical sensors, sound sensors, touch sensors and radio frequency sensors.

3. The system according to claim 1, wherein at least one sensor of said plurality of sensors is positioned within a passenger cabin of said vehicle.

4. The system according to claim 1, wherein each of said plurality of sensors senses a condition selected from a group of conditions consisting of: steering column movement, driver head movement, driver eye movement, driver body movement, slurred speech, snoring, alcohol in breath, road conditions, proximity to road side edges, proximity to road paint strips or roadway obstacles.

5. The system according to claim 1, wherein said processing unit comprises a Digital Signal Processor.

6. The system according to claim 5, wherein Digital Signal Processor utilizes parallel processing to carry out its processing.

7. The system according to claim 5, wherein Digital Signal Processor utilizes neural network/fuzzy logic to carry out its processing.

8. The system according to claim 1, wherein said processing unit is capable of communicating with devices other than said one or more sensors.

9. The system according to claim 1, wherein said predetermined action is selected from a group of actions consisting of: an audio signal, a visual signal, reducing the speed of said vehicle, opening a window of said vehicle, turning on a flasher signal, initiating a driver speech slurring test, automatically dialing the police, automatically dialing another party, and disabling said vehicle; and wherein said processing unit initiates no action if said assessed ability indicates that said driver is operating said vehicle safely.

10. A system for monitoring a driver's ability to safely operate a vehicle comprising:
- a plurality of sensors positioned on a vehicle;
- said sensors sensing conditions indicative of a driver's ability to safely drive said vehicle;
- said conditions comprising conditions regarding said driver, conditions within said vehicle, and conditions outside said vehicle; and
- a processing unit in communication with said sensors, said processing unit receiving data from said sensors, analyzing said data to determine an appropriate response, and initiating said response, said processing unit capable of receiving instructions from a source external to said system to override said initiating response.

11. The system according to claim 10, wherein said plurality of sensors are selected from a group of sensors consisting of: motion sensors, infrared sensors, position sensors, audio sensors, video sensors, chemical sensors, sound sensors, touch sensors or radio frequency sensors, or any combination thereof.

12. The system according to claim 10, wherein said data is selected from a group of data consisting of: steering column movement, driver head movement, driver eye movement, driver body movement, slurred speech, snoring, alcohol in breath, road conditions, proximity to road side edges, proximity to road paint strips, or roadway obstacles, or any combination thereof.

13. The system according to claim 10, wherein said response is selected from a group of responses consisting of: an audio or visual signal, reducing the speed of said vehicle, opening one or more windows of said vehicle, turning on a flasher signal, initiating a driver speech slurring test, automatically dialing the police or another party and disabling said vehicle, or any combination thereof; and wherein said processing unit initiates no action if said data indicates that said driver is operating said vehicle safely.

14. A method of preventing or reducing vehicle accidents comprising the steps of:
(a) sensing safety data indicative of a drivers ability to safely drive a vehicle, said safety data comprising conditions regarding said driver, conditions within said vehicle, and conditions outside said vehicle;
(b) analyzing said safety data to determine an appropriate response; and
(c) initiating said appropriate response, wherein said response can be overridden by a source external to said vehicle.

15. The method according to claim 14 further comprising the step of:
(d) determining whether said driver is authorized to drive said vehicle.

16. The method according to claim 15 further comprising the step of:
(e) disabling said vehicle if said driver is not authorized to drive said vehicle.

* * * * *